(12) United States Patent
Bowman

(10) Patent No.: US 12,012,008 B2
(45) Date of Patent: Jun. 18, 2024

(54) SYSTEMS AND METHODS FOR SMART CHAIN CHARGING OF RECHARGEABLE BATTERIES IN ELECTRIC VEHICLES

(71) Applicant: David Bowman, Ponte Vedra, FL (US)

(72) Inventor: David Bowman, Ponte Vedra, FL (US)

( * ) Notice: Subject to any disclaimer, the term of this patent is extended or adjusted under 35 U.S.C. 154(b) by 423 days.

(21) Appl. No.: 17/165,412

(22) Filed: Feb. 2, 2021

(65) Prior Publication Data

US 2021/0237597 A1  Aug. 5, 2021

Related U.S. Application Data

(60) Provisional application No. 62/969,480, filed on Feb. 3, 2020.

(51) Int. Cl.
*B60L 53/16* (2019.01)
*B60L 53/10* (2019.01)
(Continued)

(52) U.S. Cl.
CPC .............. *B60L 53/16* (2019.02); *B60L 53/10* (2019.02); *B60L 53/14* (2019.02); *B60L 53/20* (2019.02);
(Continued)

(58) Field of Classification Search
CPC ........ B60L 53/305; B60L 53/10; B60L 53/14; B60L 53/16; B60L 53/20; B60L 53/665;
(Continued)

(56) References Cited

U.S. PATENT DOCUMENTS 7,859,223 B2    12/2010  Gorbold
8,188,708 B2    5/2012   Altekruse et al.
(Continued)

FOREIGN PATENT DOCUMENTS

JP      10117444 A  *  5/1998  .............. B60L 53/14
JP   2008312401 A  *  12/2008
(Continued)

OTHER PUBLICATIONS

Batteries and Chargers Connected in Series & Parallel, Deltran Corporation, DeLand, FL, USA, Revised Apr. 9, 2002, downloaded Jan. 21, 2021, 10 pages.
(Continued)

*Primary Examiner* — Richard Isla
*Assistant Examiner* — Manuel Hernandez

(57) ABSTRACT

Systems, devices, and methods for smart chain charging of electric vehicles. A system has a dock and one or more electric vehicles supporting rechargeable batteries. One or more electric vehicles may be coupled in series in a smart chain at the dock. Each electric vehicle has a charger with a plug and a receptacle. The plug may couple to a dock receptacle, if the vehicle is first in the smart chain, or to a receptacle on a neighboring electric vehicle at the end of a smart chain of vehicles electrically coupled to the dock. The receptacle may receive a plug of a neighboring electrical vehicle. Each charger may include an interface, battery charger and a battery monitor. The interface may carry power and transfer data into and out of the charger along the smart chain. Each battery monitor may output battery monitor data and receive battery charging control information.

17 Claims, 6 Drawing Sheets

(51) Int. Cl.
*B60L 53/14* (2019.01)
*B60L 53/20* (2019.01)
*B60L 53/30* (2019.01)
*B60L 53/34* (2019.01)
*B60L 53/60* (2019.01)
*B60L 53/66* (2019.01)
*B60L 53/67* (2019.01)
*B60L 53/68* (2019.01)
*H02J 7/00* (2006.01)

(52) U.S. Cl.
CPC ............ *B60L 53/30* (2019.02); *B60L 53/305* (2019.02); *B60L 53/34* (2019.02); *B60L 53/60* (2019.02); *B60L 53/66* (2019.02); *B60L 53/665* (2019.02); *B60L 53/67* (2019.02); *B60L 53/68* (2019.02); *H02J 7/00032* (2020.01); *Y04S 30/14* (2013.01)

(58) Field of Classification Search
CPC .......... B60L 53/67; B60L 53/30; B60L 53/34; B60L 53/60; B60L 53/66; B60L 53/68; H02J 7/00032; Y04S 30/14
USPC .......................................................... 320/109
See application file for complete search history.

(56) References Cited

U.S. PATENT DOCUMENTS

| | | | |
|---|---|---|---|
| 9,059,447 | B2 | 6/2015 | Scheucher |
| 9,673,639 | B2 | 6/2017 | Okuda et al. |
| 10,084,334 | B1 | 9/2018 | Dao et al. |
| 10,183,586 | B1 * | 1/2019 | Appelbaum .......... H02J 7/0013 |
| 10,543,741 | B2 | 1/2020 | Biderman et al. |
| 2011/0202418 | A1 * | 8/2011 | Kempton ................ H02J 3/008 |
| | | | 705/26.1 |
| 2012/0286729 | A1 * | 11/2012 | Yegin .................... B60L 3/0069 |
| | | | 320/109 |
| 2014/0179164 | A1 * | 6/2014 | Kanamori ............... B60L 53/65 |
| | | | 439/620.21 |
| 2016/0241081 | A1 | 8/2016 | Nandam et al. |
| 2019/0100108 | A1 | 4/2019 | Davis et al. |
| 2019/0366862 | A1 | 12/2019 | Anton |
| 2020/0031247 | A1 | 1/2020 | Moravick et al. |
| 2020/0223507 | A1 * | 7/2020 | Le Rodallec .......... B60L 53/16 |

FOREIGN PATENT DOCUMENTS

| | | |
|---|---|---|
| JP | 2010088190 A * | 4/2010 |
| RU | 2712145 C1 | 1/2020 |
| WO | 2014039104 A1 | 3/2014 |
| WO | 2017217929 A1 | 12/2017 |
| WO | 2019010582 A1 | 1/2019 |
| WO | 2019038546 A1 | 2/2019 |

OTHER PUBLICATIONS

Compact, Lightweight, Smart Battery Charger, Final Report, NVE Corporation, Oct. 26, 2005, 55 pages.

Dörffel, D., Energy Management of Hybrid Electric Vehicles, School of Engineering Sciences, University of Southampton, 2002, 46 pages.

GE WattStation Pedestal EVSE Charger Operation and Maintenance, User Manual, GE Company, 2012, 59 pages.

Serial and Parallel Battery Configurations and Information, Battery University, https://batteryuniversity.com/learn/article/serial_and_parallel_battery_configurations, last updated Jun. 18, 2019, downloaded on Jan. 21, 2021, 69 pages.

* cited by examiner

SYSTEMS AND METHODS FOR SMART CHAIN CHARGING OF RECHARGEABLE BATTERIES IN ELECTRIC VEHICLES

BACKGROUND

Technical Field

The field relates to electric vehicles and electric vehicle charging.

Background Art

Bike sharing has evolved through two generations, first with non-motorized bike sharing programs like CITIBIKES bike sharing system, and then with electric assisted bike sharing companies like the LIME bikes system.

First Generation: Docks

The first bike sharing generation, exemplified by Manhattan's iconic blue CITIBIKES bike sharing system, features large metal bike-docks that do triple-duty as payment kiosk, parking lot, and bike-lock. Using a smartphone application (app), a user locates a dock that has available vehicles. The user walks to the selected dock and uses the dock's kiosk to start a biking session. The activation of a new session triggers mechanical unlocking of one of the bikes in the dock. The user withdraws the bike from the dock, rides the bike, and, concludes the ride at the dock closest to the user's destination that has an empty parking slot. The user terminates the session by depositing and re-locking the bike into the destination dock's empty parking slot.

This paradigm has two primary drawbacks. First, the docks are expensive and occupy a large amount of space on the road or sidewalk. High dock costs (financial and square foot) result in a low density of docks, in turn requiring users to walk significant distances, first from the user's starting location to the pick-up dock, and then from the drop-off dock to the user's destination. Second, a fixed number of slots in each dock can sometimes require users to visit multiple docks in search of an empty slot to deposit the bike at the end of the session.

However, this type of bike docking has three major benefits: (1) between sessions, bikes are parked in an orderly fashion, without obstructing sidewalks/roads; (2) bikes are locked, preventing casual theft; and (3) while the first generation of bike-sharing utilized manual (non-electrified) bikes, the docks are wired with electricity, giving them the flexibility to charge electric bikes, if electric bikes were introduced to the system.

Second Generation: Dock-Less

In bike-sharing's second generation, typified by LIME electric bikes, physical docks are eliminated. In between sessions, bikes are parked randomly on city sidewalks, and not locked to anything. Using a smartphone app, a user locates the closest available bike to the user's starting location (which is parked somewhere on a near-by sidewalk). The user walks to the bike, and uses the biker sharing company's mobile app to start a session. The bike sharing company's server sends a signal to the bike (via mobile data connection), activating the vehicle's electric power and releasing the bike's parking brake. The user rides to his/her destination, parks the bike on the sidewalk adjacent to the user's destination and uses the app to terminate the session. Terminating the session, the bike sharing company's server sends a signal to the bike to deactivate the electric power and engage the parking brake.

The dock-less paradigm has two major benefits: (1) eliminates the expense of purchasing and installing the expensive docks; and (2) eliminates the need to walk from the drop-off dock to the user's destination. (Note that a dock-less paradigm does not eliminate the need to walk from the user's starting-point to the nearest available bike.)

However, the dock-less system introduces its own set of major drawbacks as it: (1) requires a team of human workers to drive around in cars each night to pick up bikes (or bike batteries), bring them home, charge them, and then return them to the city streets the next morning; (2) creates sidewalk anarchy, where unused bikes are strewn around sidewalks blocking pedestrian/bike traffic, enraging passersby; and (3) provides easy targets for vandals, who toss the bikes in lakes and steal them at an alarming rate.

BRIEF SUMMARY

The present disclosure provides technical solutions to overcome the above problems. Systems, devices, and methods for smart chain charging of electric vehicles are described. In an embodiment, a system for smart chain charging of electric vehicles has one or more docks and one or more electric vehicles utilizing rechargeable batteries. A dock coupled to an electrical power source has one or more receptacles and/or plugs configured to mate with one or more electric vehicles. Furthermore, these electric vehicles may be coupled in one or more smart chains at the dock.

Each electric vehicle has a respective charger. The charger includes a plug, and a receptacle. If the vehicle is the first vehicle to arrive at the dock, the vehicle's plug or receptacle mates with the dock. A subsequent vehicle arriving at the dock may be coupled in a smart chain configuration to an existing vehicle parked at the dock, utilizing the existing vehicle's available plug/receptacle. Subsequent vehicles may be added to the smart chain.

In a further embodiment, the dock may include an interface coupled to the receptacle of the dock. The interface may be configured to carry power and transfer data between the dock and the receptacle at the dock. A controller may process battery monitor data received over an interface from chargers coupled in a smart chain to the dock through the receptacle and output battery charging control information through the interface. A dock may also include a power supply and power monitor.

Battery monitor data may include information on battery condition of respective rechargeable batteries configured to be charged by respective chargers along the smart chain of electrical vehicles. Battery charging control information may include information on priority of charging of rechargeable batteries along the smart chain such that rechargeable batteries located in electrical vehicles at the end of the smart chain are charged first relative to other batteries in order to optimize vehicle readiness when utilizing a last in/first out paradigm of docking electrical vehicles in a smart chain.

The controller may further determine when a monitored power value is indicative of a fault condition and controls the power supply to cease providing power to the smart chain of vehicles.

In a further embodiment, each charger that is a member of a smart chain may include an interface, battery charger and a battery monitor. The interface is configured to carry power and transfer data into and out of the charger along the smart chain. The battery charger is coupled to one or more rechargeable batteries. The battery monitor is coupled to the battery charger. Each battery monitor is coupled to the interface for outputting respective battery monitor data and receiving respective battery charging control information.

In a still further embodiment, a system includes a remote server configured to communicate with the docks and the respective chargers over a network. This communication may be wired or wireless. A database may be coupled to the remote server. The remote server may be configured to manage the network of vehicles, including but not limited to management of vehicle sessions (periods of time that the vehicle is mapped for use to a specific user), management of charging, and management of locking in smart chains at one or more docks. The database may be configured to store information on one or more docks, authorized users, and electric vehicles.

In a still further embodiment, an application may be implemented on a mobile device and configured to enable a user to communicate with the remote server.

Further embodiments, features, and advantages of this invention, as well as the structure and operation and various embodiments of the invention, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

New systems, devices and methods for smart chain charging of electric vehicles are described.

The term electric vehicle as used herein refers to any type of electric vehicle including but not limited to an electric bike, electric skateboard, electric wheel, electric hovercraft, electric drone, electric robot, electric automobile, electric truck, electric cart, shopping cart, or other device used for transportation of people or goods that uses electricity. An electric vehicle may have one or more rechargeable batteries to provide electric power to an electric motor, electronic device, port, and/or display.

In one feature, a smart chain charging system (SCCS) may use high geographic density, low cost, flexible capacity docks in order to both capture the benefits and eliminate the drawbacks of bike sharing's first and second generations.

Embodiments refer to illustrations described herein with reference to particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Smart Chain Charging System (SCCS)

Figure 1:
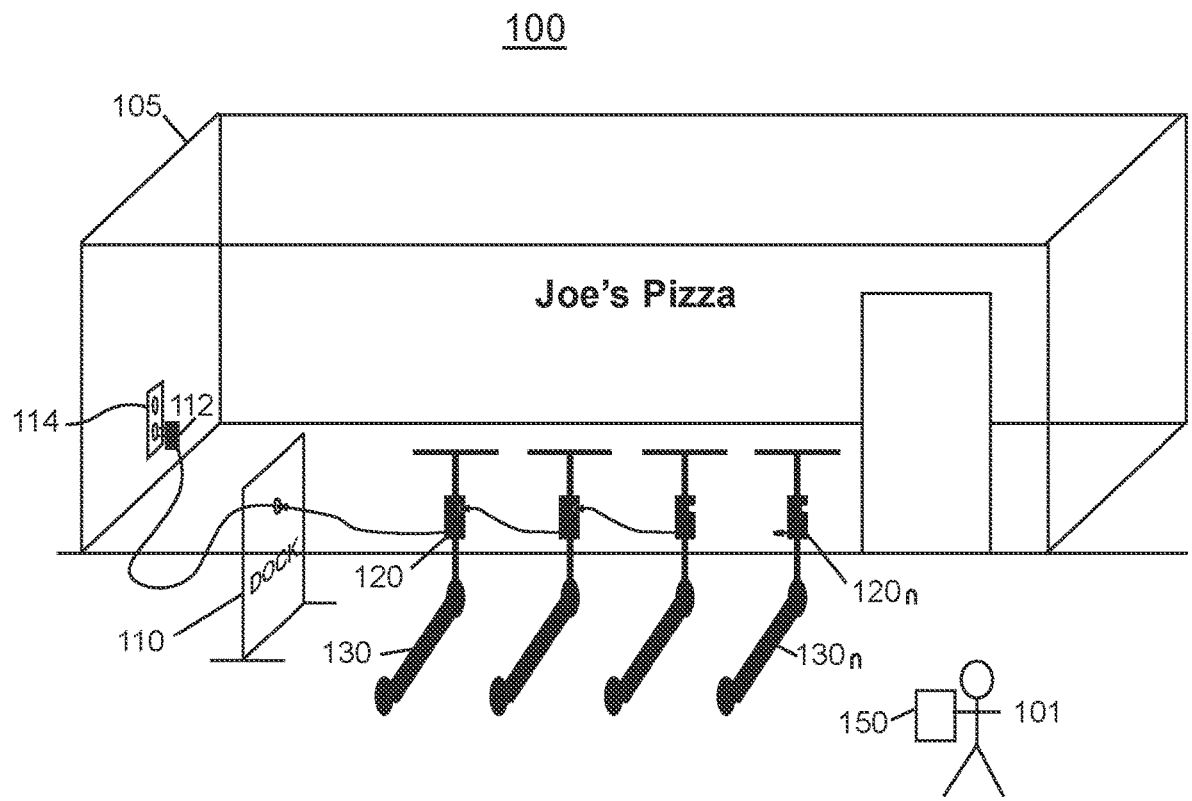
FIG. 1 is a diagram of a smart chain charging system (SCCS) for charging electric vehicles according to an embodiment of the present invention.

FIG. 1 is a diagram of a smart chain charging system (SCCS) for charging electric vehicles 100 according to an embodiment of the present invention. System 100 includes a dock 110 provided at or near a power source 105. Power source 105 for example may be a building for a business, residence, university or other entity facilitating smart chain charging. Power source 105 may be electrically coupled to a power grid or other power generator. Power source 105 may also be an existing piece of equipment that is wired with electricity, for example, a street light or advertising billboard. Power source 105 may be a mobile power source such as a generator. Power source 105 may be a piece of equipment installed specifically for the purpose of creating the SCCS. In further embodiments, power source 105 may be electrically powered by a fully or partially renewable energy source, such as, solar, wind, wave, or tidal power source.

Dock 110 is configured to receive a smart chain made up of one or more electric vehicles 130, labeled $130_1$-$130_n$ in FIG. 1, where n is an integer from 1 to n. Each electric vehicle 130 has a respective charger 120 (labeled $120_1$-$120_n$ respectively in FIG. 1). Each charger 120 can be coupled to neighboring chargers in a smart chain as shown in FIG. 1. In particular, a charger $120_1$ on vehicle $130_1$ located first in the chain nearest dock 110 is electrically coupled to dock 110. Subsequent chargers $120_{2-n}$ on vehicles $130_{2-n}$ are electrically coupled in succession to the first charger $120_1$ and preceding chargers 120 on a last-in/first out basis to form a smart chain of electric vehicles 130 capable of charging at dock 110.

Dock 110 has a plug 112 that can be coupled to a receptacle 114 (such as an electrical outlet) of building 105. In other embodiments, dock 110 may be hardwired into an electrical supply. Dock 110 also may include a receptacle 113 (such as an electrical and data interface) that can receive an electrical/data plug from a first charger $120_1$ in the smart chain. These wired plugs and receptacles for electrical power and/or data transfer an/or locking are illustrative and not intended to be limiting. Any type of wired and/or wireless coupling may be used to provide power for charging batteries on electric vehicles 120. This may include electrical and/or magnetic couplings for battery charging and/or locking.

A user 101 may use a mobile device 150 to begin or end a vehicle session and to remove or return an electric vehicle 130 to dock 110. Dock 110 may include a locking mechanism (not shown in FIG. 1). The locking mechanism prevents unauthorized parties from unplugging an electric vehicle that is plugged into dock 110.

Mobile device 150 may be a computing device having communication and location capability, such as, a smartphone, watch, laptop, tablet, wearable, or other mobile computing device. Mobile device 150 may include a display and a user-interface to enable a user to provide input and receive output from the smart chain charging engine. Mobile device 150 may further include an application and/or a web browser for communicating with a remote smart chain charging engine.

Figure 4:
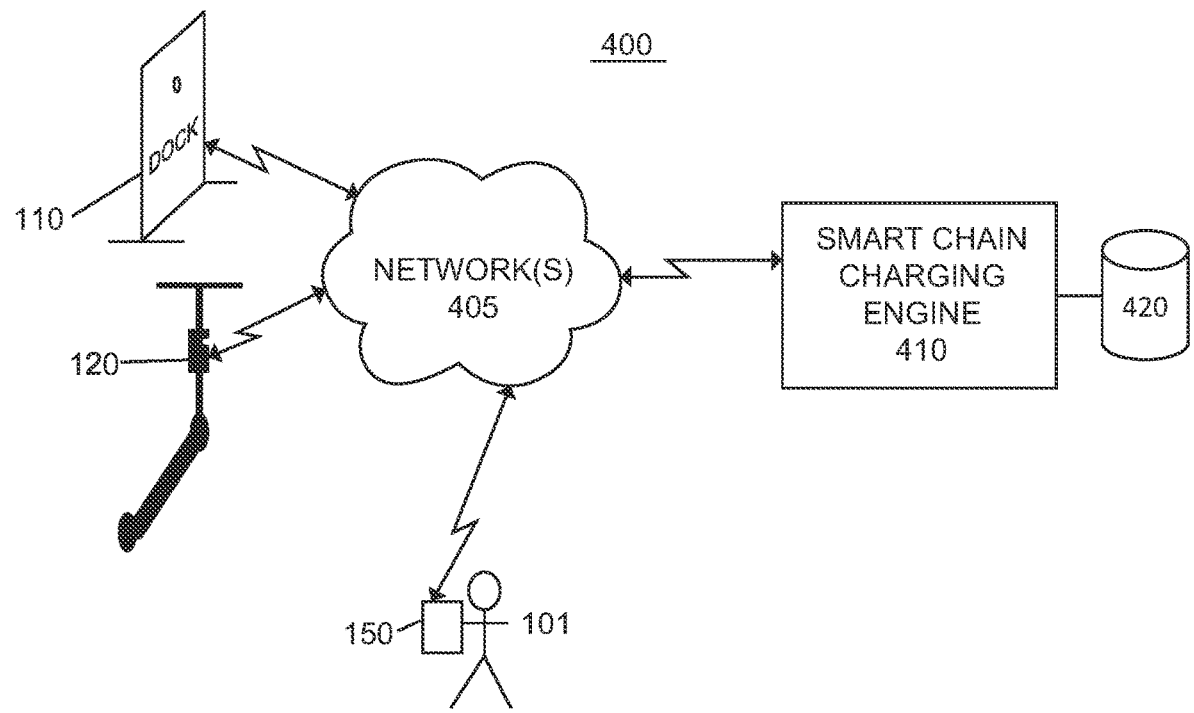
FIG. 4 is a diagram of a cloud-based smart chain charging system according to an embodiment of the present invention.

In a further feature, the usage of electric vehicles and the charging of batteries in the electric vehicles may be managed by a cloud-based smart chain charging system. FIG. 4 is a diagram of a cloud-based smart chain charging system 400 according to an embodiment of the present invention. Cloud-based smart chain charging system 400 includes a smart chain charging engine 410 coupled to one or more databases 420. Dock 110, chargers 120, and mobile device 150 are communicatively coupled over one or more data networks 405 to smart chain charging engine 410. Network(s) 405 may be any type of data network or combination of data networks including, but not limited to, a cellular data network and the Internet over a small, medium or large geographical area, such as, a city, state, region, nation, or other designated area.

Smart chain charging engine 410 may be made up of one or more servers for managing docks, users, and electric vehicles. This management may include registering users, verifying authorized users, and registering electric vehicles and docks for use in system 400. Smart chain charging engine 410 may also manage authorization and usage of electric vehicles by users including management of electric vehicles 130 placed by users in a smart chain at dock 110. Smart chain charging engine 410 may also track and provide information on various smart chains of electric vehicles at different docks. This may include information on battery configurations in different electric vehicles and the number of electric vehicles in smart chains.

Database 420 may include one or more databases storing information on docks, users, and electric vehicles. This may include information relating to authorization and management of electric vehicles placed by users in smart chains at different docks, and the charging of batteries in the electric vehicles in respective smart chains. In an embodiment, database 420 may be coupled to a remote server configured to manage vehicle sessions by users and management of electric vehicles in smart chains at one or more docks. Database 420 may be configured to store information on one of more docks, authorized users, and electric vehicles.

Dock

Figure 2:
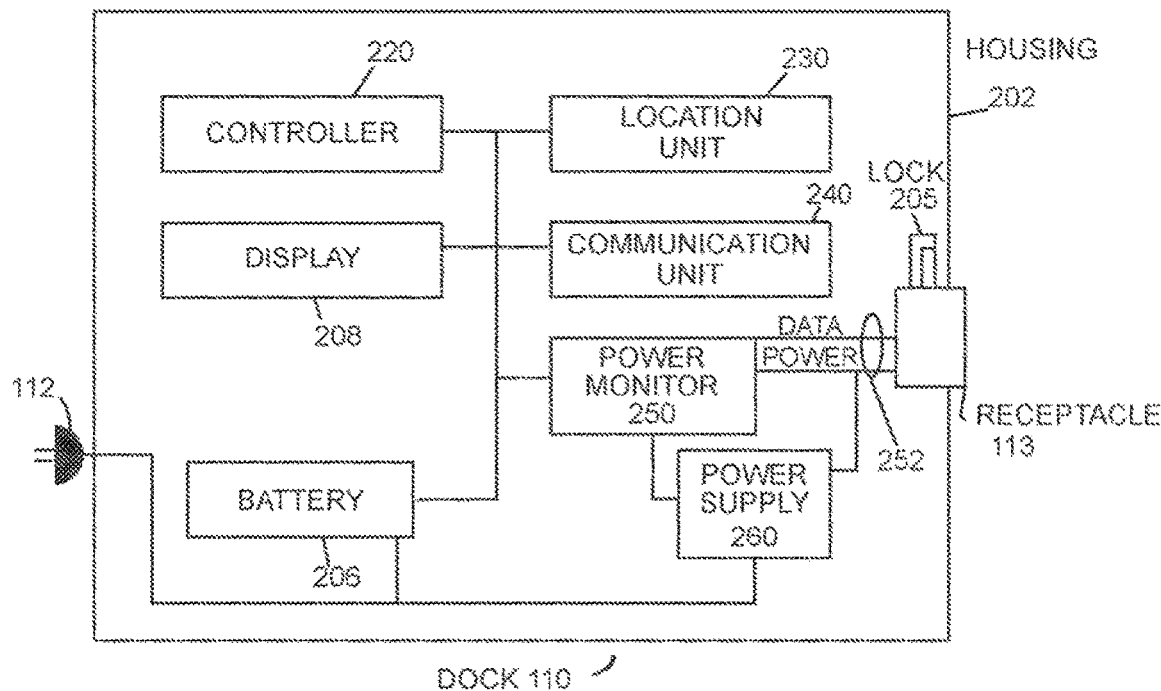
FIG. 2 is a diagram of a dock used in the system of FIG. 1 according to an embodiment.

FIG. 2 is a diagram of dock 110 according to an embodiment. Dock 110 includes a housing 202 supporting a lock 205, battery 206, display 208, plug 112 and receptacle 113. In one example, plug 112 is an electrical plug attached to an electrical cord and may be retractably positioned within housing 202. At installation, a user may pull plug 112 to extend the electrical cord from the housing 202 to enable plug 112 to reach receptacle 114 at a site providing electric power to dock 110. In other examples, dock 110 may be hardwired to a power supply directly or via a switch or fuse.

Battery 206 may be one or more rechargeable batteries. Battery 206 is optional and allows electrical power to be provided in the event dock 110 is unable to obtain power through plug 112 due to a power outage, movement of dock 110, or other event. Display 208 may be any type of display device or indicator device, such as, a touchscreen, flat panel display, one or more LEDs or indicator lamps, speaker, or other type of input/output display. A physical sign or poster of instructions may also be placed on housing 202.

Housing 202 further supports a controller 220, location unit 230, communication unit 240, power monitor 250, and power supply 260. Controller 220 is coupled to receive signals from and/or provide signals to each of lock 205, battery 206, display 208, location unit 230, communication unit 240, and power monitor 250. Controller 220 may be one or more processors, microcontrollers or other electronic control units. Location unit 230 may be a global position system (GPS) or other type of locator that obtains and provides location information identifying the current physical location of dock 110. For example, this location information may be latitude/longitude information output by a GPS chip set.

Communication unit 240 may be configured to carry out short range, long range and/or other types of wireless communication between dock 110 and external devices. Communication unit 240 may include an antenna, a transceiver and other electronics for communicating wirelessly over a network to a remote server. Communication unit 240 may support communication according to GSM, CDMA, Bluetooth, WiFi, or other communication protocols.

Power monitor 250 monitors power output to a smart chain of electric vehicles 130 coupled to dock 110 through receptacle 113. This monitored power output is representative of the current load of the one or more electrical vehicles and chargers therein coupled in a smart chain to dock 110 through receptacle 113. An interface 252 is provided to carry data and electrical power through receptacle 113 and one or more components in dock 110. Interface 252 may electrically couple power monitor 250 with receptacle 113. Interface 252 may be any type of wired interface configured to carry charging power and data communication in a cable or other type of electrical conduit or path between dock 110 and neighboring electric vehicles 120. Power monitor 250 may also pass any data communication through interface 252 to controller 220. Alternatively, controller 220 may be coupled to transmit and receive data directly over interface 252 to the smart chain.

Power supply 260 provides electrical power over interface 252. In embodiments, power supply 260 provides charging power to each of the respective electric vehicle (EV) chargers 120 of a smart chain of electric vehicles at dock 110. For example, power supply 260 may transform AC power received from a source through plug 112 to DC power output over interface 252. Alternatively, power supply 260 may pass or convert AC power received from a source through plug 112 to an AC power output over interface 252.

Power supply 260 is coupled to receptacle 113 through a power supply portion of interface 252. The power supply portion of interface 252 for example may be a set of wires (voltage and ground) to provide a drive current (I) at a drive voltage (V). In this way, power supply 260 outputs electrical power to charge batteries along the smart chain. Power monitor 250 may determine a quantity of electricity being used by dock 110 at any given moment, and in particular, the amount of power (e.g., an amount drive current I at a drive voltage V, where power=I*V) being drawn from dock 110 by a smart chain of electric vehicles 130 coupled to receptacle 113.

Charger

Figure 3:
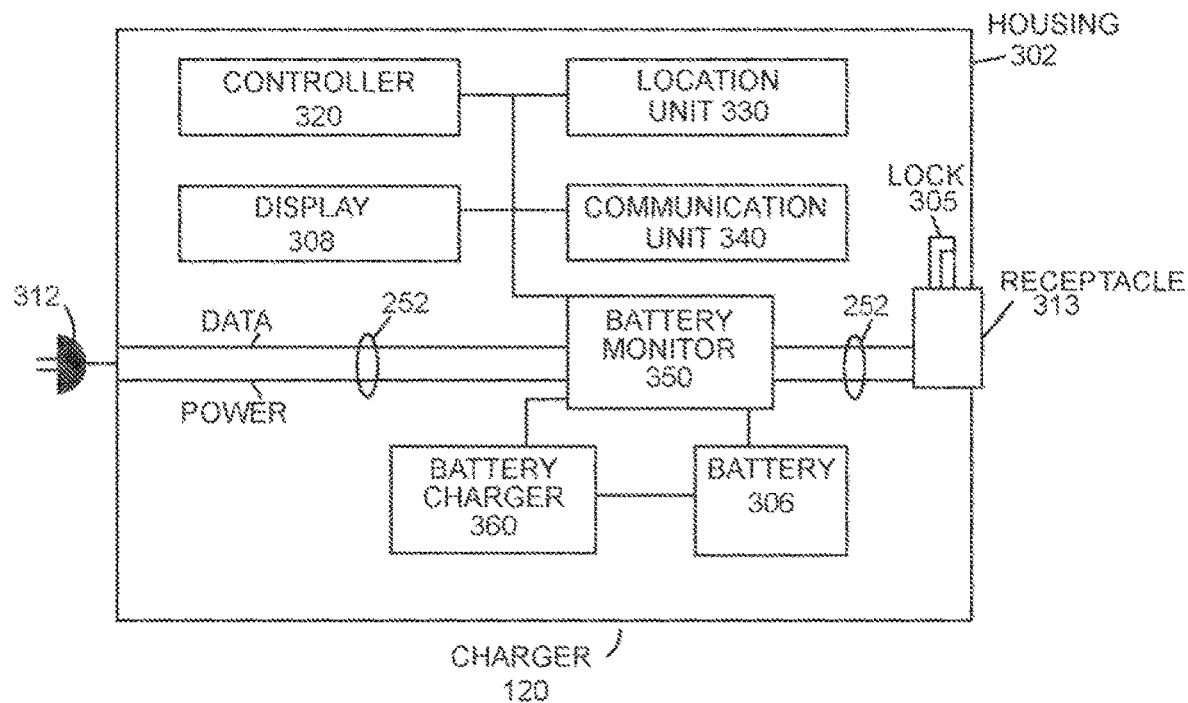
FIG. 3 is a diagram of an electric vehicle charger used in the system of FIG. 1 according to an embodiment.

FIG. 3 is a diagram of an EV charger 120 used in the system of FIG. 1 according to an embodiment. EV charger 120 includes a housing 302 which supports battery 306, display 308, plug 312 and receptacle 313. In one example, plug 312 is an electrical and data interface plug attached to a cable and may be retractably positioned within housing 112. At installation, a user may pull plug 312 to extend the cable from the housing 202 to enable plug 312 to reach a receptacle 113 at dock 110 or a similar receptacle 313 at a neighboring electric vehicle. A lock mechanism 305 may also be provided to lock and unlock a neighboring electric vehicle. Such a lock mechanism may be similar to lock 205 described earlier. In one example, the lock mechanism can secure a plug within receptacle 313 to lock an electric vehicle. In other examples, a lock mechanism may physically lock (and unlock) one electric vehicle to a neighboring vehicle. Such a lock mechanism may be a clamp, bolt, magnet, or other type of lock.

Housing 302 further supports a controller 320, location unit 330, communication unit 340, interface 252, battery monitor 350, and battery charger 360. Controller 320 may be one or more processors, microcontrollers or other electronic control units, or combinations thereof. Controller 320 may also be coupled to a lock mechanism to control locking or unlocking of a neighboring vehicle in the smart chain. Location unit 330 may be a global position system (GPS) or other type of locator that obtains and provides location information identifying the current physical location of charger 120 on an electric vehicle 130. For example, this location information may be latitude/longitude information output by a GPS chip set.

Communication unit 340 may be configured to carry out short range, long range and/or other types of wireless communication between EV charger 120 and external devices. Communication unit 340 may include an antenna, a transceiver and other electronics for communicating wirelessly over a network to a remote server.

Battery 306 may be one or more rechargeable batteries. The rechargeable batteries may be coupled in series, in parallel, in a grid, or in a combination thereof. Display 308 may be any type of display device or indicator device, such as, a touchscreen, flat panel display, one or more LEDs or indicator lamps, speaker, or other type of input/output display. A physical sign or poster of instructions may also be placed on housing 302. In examples, battery 306 and display 308 are supported by housing 302. In still further examples, battery 306 or display 308 are located anywhere on vehicle 103 within or outside of housing 302 and electrically coupled to EV charger 120. In this way, battery 306 and display 308 may be placed in more convenient or useful locations on vehicle 103 for particular applications or user or aesthetic design preferences.

Battery monitor 350 monitors the current charge level of battery 306. Battery monitor 350 is also coupled to battery charger 360. Battery charger 360 is coupled to battery 306.

In an embodiment, battery monitor 350 is also coupled along an interface 252 between receptacle 313 and plug 312. In this way, battery monitor 350 may provide data communication over a data path on interface 252. In one example, the data communication may be in either direction up or down a smart chain to EV chargers 120 on neighboring vehicles 130 or to dock 110. In one implementation, not intended to be limiting, a daisy chain interface may be used as described, for example, in U.S. Pat. No. 7,859,223 and incorporated in its entirety herein by reference. Battery monitor 350 may provide an output (such as a digital message or signal) over a data path on interface 252 indicative of the monitored charge levels of one or more batteries 306. Battery monitor 350 may also receive data from dock 110 over a data path on interface 252. The power portion of interface 252 may be coupled to power charger 120. For example, power from interface 252 may be used to drive battery charger 360 and charge battery 306. Power from interface 252 may be used to drive other components of EV charger 120.

Smart Chain Charging With Variable Load

The electrical load of a smart chain to be charged on dock 110 varies depending on a number of factors. These factors include the number of electric vehicles, the number of rechargeable batteries in each vehicle, the level of capacity of each battery, and the current charge level of each battery. Also in one feature, a smart chain uses a last-in and first-out (LIFO) connection of electric vehicles. It is desirable to make sure most recent added electric vehicles at the end of a smart chain are charged first or at a higher priority than electric vehicles closer to the dock because vehicles at the end of the chain will be removed prior to vehicles closer to the dock To help manage charging of a variable electrical load of a smart chain, data communication is provided between dock 110 and each of the EV chargers 120 in a smart chain. In particular, a battery monitor 350 in each EV charger 120 monitors and controls charging of one or more rechargeable batteries at each vehicle. Each battery monitor 350 in a smart chain may communicate with dock 110 to allow dock 110 to monitor and control charging of rechargeable batteries at each electric vehicle. For example, controller 220 at dock 110 may receive data from each battery monitor 350 of respective EV chargers 120. This data for example may include the charge level of respective batteries 306. Controller 220 may also receive data from power monitor 250 on the current load being drawn from dock 110.

Controller 220 may then identify charging needed in batteries 306 in EV chargers 120 along the smart chain. Controller 220 may also determine a charging priority to charge recently added electric vehicles so that electric vehicles at a distal end of a smart chain are charged first or at a higher priority than electric vehicles closer to the dock 10. Controller 220 may then send a message or signal along interface 252 (or wirelessly via a remote server in engine 410) to battery monitors 350 to identify which electric vehicles 130 that have batteries 306 needing charging are charged first and in what order. In this way, charging power from power supply 260 is distributed and allocated to electric vehicles 130 with batteries 306 that need charge on a priority basis. In this way, electric vehicles 130 added to a smart chain most recently can be made more quickly available to successive users with adequately charged batteries 306. In a further embodiment, controller 220 may also be coupled with a remote server in engine 410. The remote server may have a charging priority algorithm guided by artificial intelligence including machine learning that monitors variables such as usage data. In this way, the remote server may communicate with a controller 220 on dock 110 or EV chargers 120 on electric vehicles 130 to provide further control of priority of charging at different days and times depending on one more of smart chain length, location of an electric vehicle along a smart chain, geographic location, historic usage rates, or other factors.

In a further feature, controller 220 may also receive information on a number of electric vehicles or other battery charging information in each smart chain and respective dock 110 from a remote server in smart chain charging engine 410.

The type of data and information sent over interface 252 is illustrative and not intended to be limiting. In a further embodiment, power monitor 350 monitors power output representative of a load of the chargers of a first electrical vehicle and a plurality of additional electrical vehicles coupled in a smart chain to dock 110 through receptacle 113. Controller 220 in dock 110 may process battery monitor data received over interface 252 from the chargers coupled in the smart chain through receptacle 113. Each battery monitor 350 may output the battery monitor data. The batter monitor data may include information on battery condition of respective rechargeable batteries configured to be charged by respective chargers 120 along the smart chain of electrical vehicles 130 coupled to dock 110.

Controller 220 then outputs battery charging control information through interface 252 to the smart chain. The battery charging control information may include information on priority of charging of rechargeable batteries along the smart such that rechargeable batteries located in electrical vehicles at the end of the smart chain are charged prior to other batteries in accordance with a last in/first out docking of electrical vehicles in the smart chain by users.

In a further embodiment, controller 220 may also determine when a monitored power value is indicative of a fault condition and control power supply 260 to cease outputting power and also may notify the administrator of the system to troubleshoot and, if necessary, dispatch a service technician, and further, if necessary, guide users to other smart chains either on the same dock or on nearby docks.

The operation of each of dock 110, chargers 120, and cloud-based smart chain charging system 400 and the components therein is described in further detail with respect to the processes of FIGS. 5-8.

SCCS Operation

FIGS. 5-8 are flowcharts of processes for operating a smart chain charging system 400 according to an embodiment of the present invention.

Initiating Electric Vehicle Session

Figure 5:
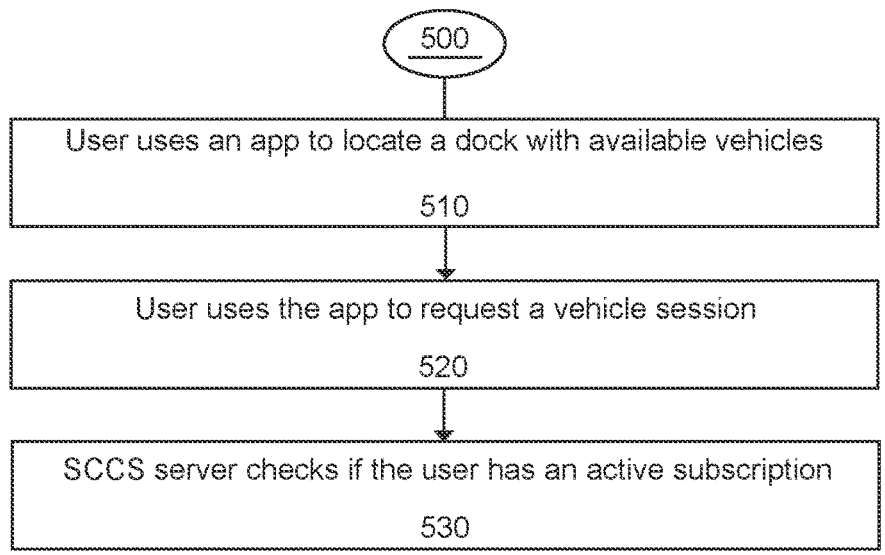
FIG. 5 shows a process for initiating a vehicle session.

FIG. 5 shows a process 500 for initiating a vehicle session (steps 510-530). In step 510, user 101 uses an application on mobile device 150 to locate dock 110 with available electric vehicles. The application may send a query to remote smart chain charging engine 410. In response, smart chain charging engine 410 may search database 420 for nearby docks and for available vehicles at the nearby docks.

One advantage of the smart chain charging system 400 is each dock 110 has relatively fewer components and lower cost than conventional bike sharing dock systems, such as, the CITIBIKE system used in New York City or the CAPITAL BIKESHARE system used in Washington, D.C. In this way, because docks 110 are relatively inexpensive, a larger number of docks 110 may be deployed. Also docks 110 take up less physical space and can scale a number of electric vehicles on a smart chain depending on available physical space. In this way, docks 110 are able to be installed in more locations at a greater density in urban areas or other areas of high usage. A high dock density will ensure that a number of docks 110 are close by to a user and a user requesting an electric vehicle is more likely to receive a positive response in step 510.

In step 520, user 101 selects a dock (such as dock 110) with an available vehicle and requests a vehicle session. For example, a user may input his or her selection through the application on the mobile device 150. In response, the application may send a request to remote smart chain charging engine 410 to start a vehicle session that permits user 101 to use a vehicle from the selected dock. In step 530, smart chain charging engine 410 checks to determine if user has an active subscription which permits use of the selected electric vehicle. Control proceeds to step 600.

Removing Electric Vehicle from Smart Chain

Figure 6:
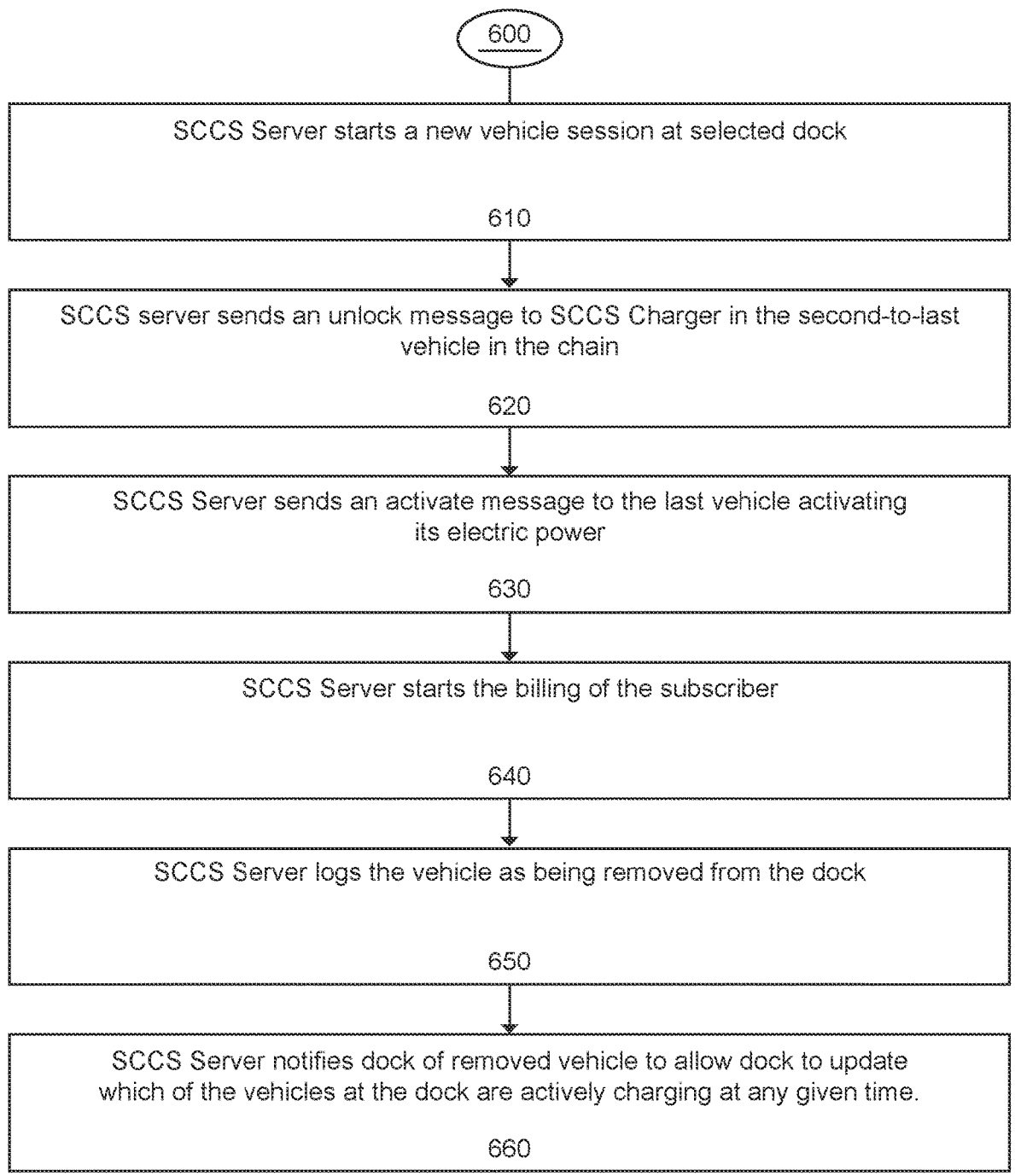
FIG. 6 shows a process for removing an electric vehicle from a dock in a session according to an embodiment of the present invention.

FIG. 6 shows a process 600 or removing an electric vehicle 130 from a dock 110 in a session according to an embodiment of the present invention (steps 610-660).

In step 610, if the user has an active subscription and is therefore eligible to use a vehicle from the selected dock, smart chain charging engine 410 (which may be a server and is also referred to as SCCS server) starts a new vehicle session at that dock 110. The last electric vehicle in the smart chain at dock 110 is made available to user. The SCCS server may send an unlock message to a respective charger 120 (also referred to as SCCS Charger) in the second-to-last electric vehicle in the chain at dock 110 to unlock a lock 205 at its receptacle (or other location on housing 202) to free the plug of the last electric vehicle in the chain (step 620). In some embodiments, a dock may incorporate multiple receptacles in order to support multiple smart chains, thereby enabling the SCCS server to assign to the user the last electric vehicle in any of the chains, to further optimize the systems's charging algorithm.

The SCCS Server also sends a message to the last electric vehicle activating its electric power (step 630).

In step 640, the SCCS Server starts the billing of the subscriber (the user with an active subscription).

In step 650, the SCCS Server logs the electric vehicle as being removed from the dock. This log data may be stored in database 420. The SCCS Server may also store an update in database 420 helping identify which of the electric vehicles at the dock are actively charging at any given time.

Electric Vehicle Return

Figure 7:
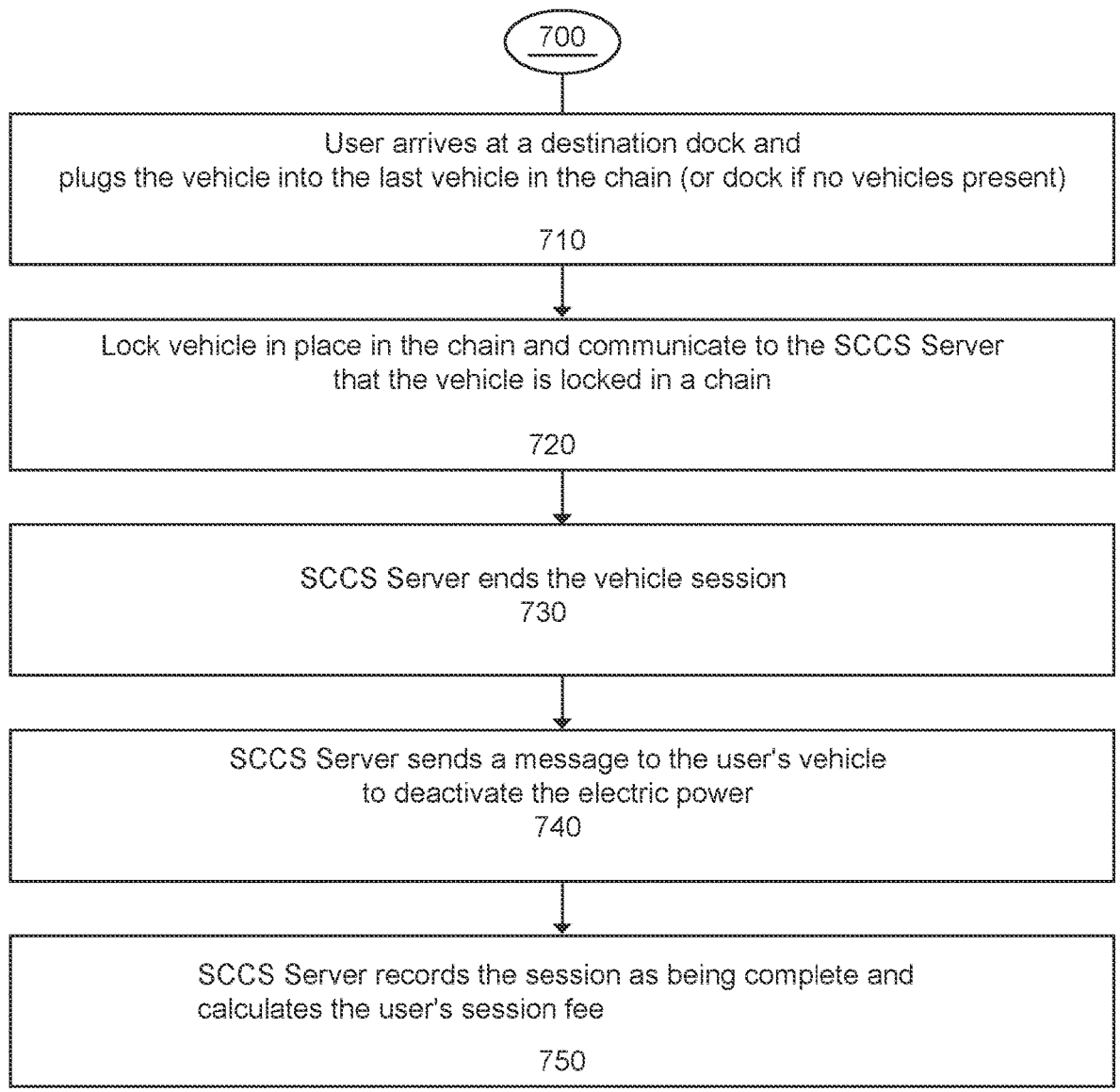
FIG. 7 shows a process for returning an electric vehicle to a dock in a session according to an embodiment of the present invention.

FIG. 7 shows a process 700 for returning an electric vehicle to a dock in a session according to an embodiment of the present invention (steps 710-750). This dock may be the same dock or a different dock depending upon the user's route. The user may use the application to locate the dock closest to his/her destination, and rides the electric vehicle to that dock. The application may provide turn-by-turn directions to the target dock. For example, in one embodiment, because docks are so low cost and only require a power source, a target density may be used of at least one dock per city block, for example, integrated into or attached onto street light-poles.

In step 710, the user arrives at the target dock and plugs the electric vehicle into the last electric vehicle in the smart chain (or to the dock, if no prior vehicles are parked at the dock). This ensures that the electric vehicles are parked in an orderly manner, such as along a store-front hosting the dock, and not parked haphazardly on a sidewalk. The user locks the electric vehicle to the dock's smart chain (or to the dock itself, if no electric vehicles are already parked at the dock). The user grasps the electric vehicle's charging plug and pulls, unspooling the charging cord from the SCCS Charger 120. The user inserts the charging plug into the charging receptacle of the prior electric vehicle parked at the dock.

In step 720, the charging receptacle's locking mechanism may be activated to lock the plug into place. For example, the SCCS Charger 120 of the $2^{nd}$ to last electric vehicle communicates with the SCCS Charger 120 of the user's electric vehicle, and both electric vehicle' SCCS Chargers 120 communicate to the SCCS Server in engine 410 that the electric vehicle are locked together.

In step 730, the SCCS Server ends the electric vehicle session.

In step 740, the SCCS Server sends a message to the user's electric vehicle to deactivate the electric power. SCCS Server may also record the session as being complete in database 420, and calculate the user's session fee (step 750). The SCCS Server then adds the user's electric vehicle to the information stored regarding the dock's smart chain in database 420 to ensure that the last in electric vehicle receives active charging time to prepare it for its next session (because it is the last electric vehicle in the dock's chain, it will be the next electric vehicle to have an active Electric Vehicle Battery Charging on a Smart Chain session at that dock).

Figure 8:
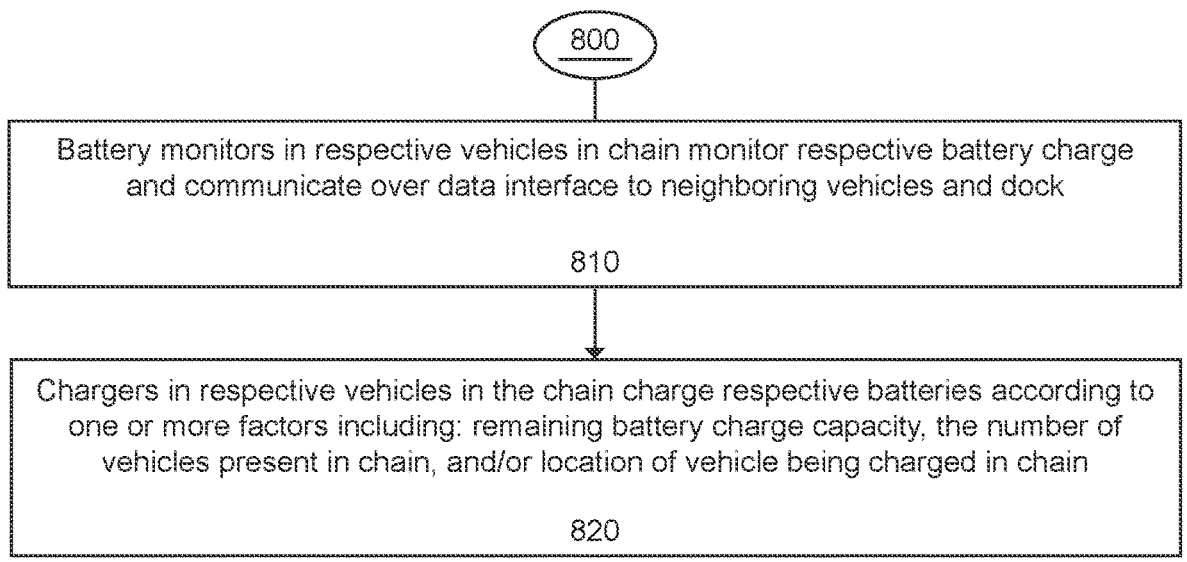
FIG. 8 shows a process for charging electric vehicles in a smart chain according to an embodiment of the present invention.

While electric vehicles 130 are coupled to a smart chain at a dock 110, each of their respective chargers 120 monitors battery charging and controls power supply output to charge the rechargeable batteries accordingly. FIG. 8 shows a process 800 for charging batteries of electric vehicles 130 in a smart chain according to an embodiment of the present invention (steps 810-820). In step 810, battery monitors 350 in respective vehicles in chain monitor respective battery charge and communicate over data interface to neighboring vehicles and dock. In step 820, chargers in respective vehicles in the chain charge respective batteries according to one or more factors including: remaining battery charge capacity, the number of vehicles present in chain, and/or location of vehicle being charged in chain. For example, in one feature, the charging charges the rechargeable batteries in respective electric vehicles in the smart chain according to the location of the electric vehicle being charged within a smart chain relative to other vehicles in the smart chain and a last in/first out priority.

Wireless Battery Monitoring Along a Smart Chain

In a still further embodiment, an interface 252 may be used with a power interface only which does not include wired data communication. In this simpler design, interface 252 would allow power to pass from power supply 260 through interface 252 to each of chargers 120. Power monitor 250 can still monitor the load. Battery monitors 350 can still monitor battery conditions and generate battery monitor data. However, in this embodiment, battery monitor data may be sent wirelessly to smart chain charging engine 410. Smart chain charging engine 410 can then process the received battery monitor data and send any control signals or information to controller 220 and/or chargers 120. In this way, charging of different batteries along the smart chain may be controlled through wireless communication with smart chain charging engine 410 rather than a separate wired data path in interface 252.

Further Embodiments and Advantages

Smart chain charging systems and methods for charging electric vehicles are disclosed according to further embodiments of the present invention.

In an embodiment, the SCCS has three primary components:

SCCS Dock: Ultra-low cost, an SCCS Dock is essentially a "smart" extension cord. One end plugs into a conventional wall-outlet inside any retail store-front or is wired into any outside power source such as a street lamp, and has a small box containing a charger or transformer, a computer processor, and a radio transmitter. The other end of the cord, supported by a simple sign advertising the dock, is one or more proprietary electrical receptacle that an SCCS equipped bike can plug into. These receptacles may have locking mechanisms. The locking mechanism prevents unauthorized parties from unplugging a bike that is plugged into it.

SCCS Charger: This is a component that is built into each bike. One side of the Charger has a plug, and the other side has an electrical receptacle that accepts another bike's charging plug. The receptacle has a locking mechanism that prevents unauthorized parties from unplugging a bike that is plugged into it. The plug may be fixed or may be mounted to a retractable charging cord (similar to retractable cords found on vacuum cleaners). The first bike to park at a dock plugs into the dock; each subsequent bike parked at the dock plugs into the prior bike that arrived to park at the dock, forming a chain of bikes. When a user activates a new biking session from that dock, the user removes the most recently parked bike from the chain.

SCCS Server: A server communicates with SCCS Docks and Chargers and is responsible for session control, charging schedules, subscription, billing, use analytics, etc. Notably, the SCCS Server uses a smart algorithm to limit the number of bikes being simultaneously charged at a given dock in order to ensure that the dock does not draw more amperage than available to it. In one example, the server may communicate wirelessly with the SCCS Docks and/or Chargers over a network. The SCCS server and its algorithm may be implemented on one or more remote computing devices as part of a cloud-computing system hosted on the Internet or other network to store, manage and process data. The SCCS server and its algorithm (along with an app used by a user on a mobile device) may also be provided as part of a software-as-a-service (SaaS) or other cloud-based service.

In this way, an example of a SCCS may have game-changing advantages. These advantages may include one or more of the following:

A. Unlike the dock-less paradigm which requires human employees to collect the bikes or bike batteries each night and bring them home for charging, the SCCS charges bikes while they are docked. Smart charging algorithms limit the number of bikes being simultaneously charged by a single dock (to prevent the dock from drawing more amperage than available in a standard wall outlet). This charging algorithm incorporates factors such as which bikes need charging the most and which bikes are most likely to be used next.

B. Unlike a conventional first-generation docking paradigm which has a low density of docks requiring users to walk long distances, SCCS docks are so inexpensive and take up so little space, a high density of docks can be installed throughout the city, ensuring that users have docks convenient to them at any time.

C. Unlike the first-generation docking paradigm which has large, heavy docks that are built into the pavement, SCCS docks, which are essentially just "smart" extension cords, can be effortlessly installed, moved, and removed based on need. A dock can be installed anywhere with a hardwired power source (such as a building or street-light) or anywhere with a mobile power source (such as a generator). SCCS docks can even easily be temporarily installed for events that anticipate a high volume of bike parking.

D. Unlike the first-generation docking paradigm with fixed-capacity docks, SCCS docks are flexible capacity. They only take up as much space as the number of bikes parked at the dock, and, from a technical perspective, an unlimited number of bikes can be added.

E. Unlike the dock-less paradigm which results in bikes being parked haphazardly on sidewalks blocking pedestrian and bike traffic, SCCS docking ensures that bikes are parked in an orderly manner on the sidewalk along the store-front.

F. Unlike the dock-less paradigm which is prone to vandals stealing bikes and repositioning them in adverse locations (e.g. in lakes, up in trees, etc.), some SCCS embodiments lock vehicles in place, precluding casual theft/vandalism.

G. Unlike the first generation docking paradigm which requires the city to allocate large swatches of sidewalk/street to install permanent metal docks, the SCCS may partner with retail stores to participate in the program to add docks. The retail stores can be financially compensated, and also can be given the option to incentivize customers via the SCCS (for example, providing free use of an SCCS bike if the bike is used to travel to the store and park at the store's dock).

H. Unlike the first generation docking paradigm with locking mechanisms unique to a particular model of bike, the SCCS can support multiple bike (and other small vehicle) types because the SCCS Charger's plugs and receptacles are universal to the SCCS.

Example SCCS Component Details

SCCS Dock

An SCCS dock may include:

Electrical meter: Records quantity of electricity being used by dock at any given moment. If this quantity is different from the expected electrical draw based on the number of bikes being actively charged at the moment, the dock electricity is disabled and a service technician is dispatched. (If more or less current is being drawn from the dock than expected, this could indicate an equipment failure or tampering with the system.)

GPS: Tracks the dock location.

Radio transmitter: Communicates with SCCS Server.

Transformer/Charger: Modulates phase/voltage/amperage of the electricity sent to bikes.

Socket: Positioned outside on the sidewalk, this is an electric receptacle that a bike's SCCS Charger plug plugs into.

SCCS Charger

An SCCS Charger may include:

Battery charger: Connected to vehicle's battery. Controlled by SCCS Server.

Battery meter: Measures percent battery charge.

Plug: Proprietary plug on cord that retracts into SCCS Charger module.

Socket: Accepts SCCS plugs. Locking mechanism that locks the plugs into place and is controlled by the SCCS Server.

GPS: Transmits vehicle location to SCCS Server.

Radio transmitter: Communicates with SCCS Server.

SCCS Server

An SCCS Server may include:

Vehicle Database: Catalog of SCCS enabled vehicles.

Vehicle location

Vehicle status (docked, active session, error)

Vehicle battery charge percent

Vehicle miles since service

Dock Database: Catalog of SCCS docks.

Dock location

Electricity consumption log

Status (online/unplugged/error)

Docked vehicles

User Database:

Subscriber status (active/inactive)

Subscriber usage log

Session Controller:

Triggers plug unlock mechanism

Activates/deactivates vehicle electric power

Charging controller: Determines which docked vehicles are charged at any given time based on an algorithm incorporating vehicle use forecasts and battery charge levels. Restricts number of vehicles simultaneously charged at a dock to prevent overdrawing the electrical outlet the dock is plugged into.

Dock host database: Calculates compensation paid to electricity provider.

Marketing Opportunities for Hosts of SCCS Docks

Because many hosts of SCCS docks may be retailers, an SCCS bike-share company can offer many opportunities for dock hosts to leverage SCCS for marketing. For example, an SCCS system may (1) enable dock host to provide free/discounted bike rides to the host's dock; (2) enable dock host to provide product discounts to people who park at the host's dock; or (3) enable dock host to include a short advertising message/logo on the map of SCCS docks.

SCCS For Public Parking/Charging

Separate from bike sharing programs, the SCCS technology can be used to provide a network of public parking/charging stations for individuals using their own small electric vehicles.

The SCCS Charger specifications can be licensed to vehicle manufacturers for inclusion in small electric vehicle models (bikes, mopeds, scooters, etc.).

Owners of SCCS enabled vehicles can enroll in an SCCS subscription.

In a given city/country, one of a variety of possible subscription plans must be selected:

Subscriber pays a fixed monthly subscription fee per vehicle (based on vehicle type); SCCS installs docks and pays retailers a fee based on electricity used and/or parking square footag occupied.

Subscriber pays a fixed per kW charging fee. A portion of these fees are passed onto retailers based on electricity usage.

Retailers pay SCCS a per parking-hour fee. Retailers set parking/charging fees that subscribers pay. Retailers can subsidize parking to attract customers, and even offer product discounts to subscribers who use the SCCS to foster use of electric vehicles.

A subscriber parks his/her vehicle at any Public SCCS dock. While parked, the vehicle charges (according to algorithm), and subscriber is billed according to plan.

Unlike SCCS for bike sharing, where the user always removes the last bike from the chain, with SCCS for public charging stations, the user must remove his/her own vehicle, which may be in the middle of the chain. Therefore, when a user removes his/her vehicle from the middle of the chain, the user unplugs his/her vehicle from the vehicle's receptacle on the vehicle to the left, and removes the plug from the vehicle on the right that is plugged into his/her vehicle. The user must remove his/her vehicle from the chain, and then reestablish the chain by plugging the vehicle that had been on the right into the vehicle that had been on the left.

Plugs and Receptables May be Interchanged

In the examples above plugs and receptacles at power source 105, dock 110, and EV chargers 120 may be interchanged. Plugs and receptacles (such as plug 112 and receptacle 114, and plug 312 and receptacle 313) may be configured to couple in either direction to and from power source 105, dock 110 and EV chargers 120 along a smart chain. For instance, in still further embodiments, plugs and receptacles may also be reversed. Power source 105 may have a plug 112 instead of dock 110. In this way, plug 112 may be omitted from dock 110 (and replaced with a receptacle like 114). A user or administrator may electrically couple a plug from power source 105 into an electrical power receptacle on housing 202 of dock 110. Similarly, in each EV chargers 120, plug 312 may be omitted and replaced with a receptacle 313. A user may electrically couple a plug from a dock 110 (if one vehicle in smart chain) or a neighboring vehicle into an electrical power on housing 302 of an EV charger 120.

Also plug 112 and receptable 113 may be either a male to female connection or a female to male type connection in wired electrical couplings. Plug 312 and receptable 313 may be either a male to female connection or a female to male type connection in wired electrical couplings. Wireless coupling such as magnetic coupling may also be used in still further embodiments.

In further embodiments, dock 110 may have multiple plugs 112 and/or receptacles 113 on the same or different sides of housing 202. For example, power source 105 may be a street light configured to by a dock. In some applications it is desirable to have vehicle parking areas (that is spaces for smart chains of connected vehicles) radiate from one or more sides of the street-light (e.g., parallel to a road where the street-light is located). This might be advantageous from a space perspective and also from the perspective of providing the system latitude in assigning to the user a vehicle at the end of either chain (because the dock has multiple smart chains).

Other Embodiments

In still further embodiments, mobile device 150 and applications are optional and may be omitted. For example, consider use cases where a university, city, or employer deploys multiple docks 110 for free to users of vehicles 130. A user may then simply initiate a vehicle session (for example by swiping or tapping a user ID card, FOB, or other key) without having to use an application.

In other embodiments, a vehicle 130 may be a shopping cart or luggage cart. Each cart would be provided with a respective charger 120 configured to be coupled in a smart chain with a dock 110.

Such carts are often stored in last in/first out order. In embodiments, smart chain charging may be used as described herein to provide electrical power to recharge batteries on the carts. The rechargeable batteries may power motors to drive the carts, or may power displays, electronic devices or ports on the carts. Even if the carts are push carts and do not use power to drive wheels, battery power may be used to power attached smart devices. For example, a grocery cart could be equipped with a touch-screen device to help a user find a specific product, and the touch screen device would need a rechargeable battery. In this case, smart chain charging as described may be carried out along a smart chain of carts coupled to a dock. Shopping carts often already are stored in Last In/First out order and may simply be equipped with electrical contacts in the front and in the back. With this example system, (a) there would be no user application, (b) there would be no locking, and (c) the battery would not be used to propel the cart device.

These examples and advantages described above are illustrative and not necessarily intended to be limiting. As would be apparent to person skilled in the art given this description different SCCS systems and methods may be used with one or more of the features or different combinations of the features described above.

Further Example Computer-Implemented Implementations

Smart chain charging engine 410 including one or more remote servers as described herein can be implemented on or more computing devices at the same or different locations. Computer-implemented functions and operations described above and with respect to embodiments including dock 110, charger 120, an application on mobile device 150 and smart chain charging engine 410 and one or more remote servers can be implemented in software, firmware, hardware or any combination thereof on one or more computing devices. Database(s) 420 may store records and may be relational databases. This is illustrative and other data structures and types of computer-readable memory storage may be used for data storage. In embodiments, a remote server and SCCS server as described herein can be implemented on a server, cluster of servers, server farm, or other computer-implemented processing arrangement operating on or more computing devices at the same or different locations.

Cloud-based smart chain charging system 400 including smart chain charging engine 410 and database 420 may be implemented as part of a computer-implemented cloud-base service platform. This platform may include a software-as-a-service (SaaS), platform as a service (PaS), or other web enabled service for an application operated by a user on a mobile device 150 may access through a browser or as a native application supporting web protocols. A platform may also include application programming interfaces (APIs) for coupling to remote services.

Embodiments are also directed to computer program products comprising software stored on any computer-usable medium. Such software, when executed in one or more data processing devices such as a processor, causes a data processing device(s) to operate as described herein or, as noted above, allows for the synthesis and/or manufacture of electronic devices (e.g., ASICs, or processors) to perform embodiments described herein. Embodiments employ any computer-usable or-readable medium, and any computer-usable or-readable storage medium known now or in the future. Examples of computer-usable or computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.). Computer-usable or computer-readable mediums can include any form of transitory (which include signals) or non-transitory media (which exclude signals). Non-transitory media comprise, by way of non-limiting example, the aforementioned physical storage devices (e.g., primary and secondary storage devices).

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for charging rechargeable batteries of electric vehicles in a smart chain, comprising:
   monitoring the rechargeable batteries in respective electric vehicles in the smart chain;
   charging the rechargeable batteries in the respective electric vehicles present in the smart chain according to one or more factors including remaining battery charge capacity, a number of electric vehicles present in the smart chain, and a location of an electric vehicle being charged within the smart chain relative to other electric vehicles in the smart chain;
   using a remote server, configured to communicate wirelessly with the electric vehicles, a dock coupled to the smart chain, and a database, to manage electric vehicle sessions initiated by authorized users, and to manage electric vehicles in the smart chain, wherein the database is configured to store information on the dock, the authorized users and the electric vehicles:
   starting an electric vehicle session via the remote server, and sending an unlock message to a charger of a penultimate electric vehicle of the smart chain in response to an authorized user selecting the dock through an application on a mobile device; and
   unlocking, via the charger of the penultimate electric vehicle, a lock at a receptacle locking a last electric vehicle to the penultimate electric vehicle to free the last electric vehicle in response to the unlock message, such that the last electric vehicle is an authorized user's electric vehicle.

2. The method of claim 1, wherein the charging charges the rechargeable batteries in the respective electric vehicles in the smart chain according to the location of the electric vehicle being charged within the smart chain relative to other electric vehicles in the smart chain and a last in/first out priority.

3. An electric vehicle docking system for connecting electric vehicles in a smart chain configuration to charge rechargeable batteries in the electric vehicles, comprising:
   a dock comprising:
     an electrical connector for receiving electrical power at the dock,
     a dock receptacle configured to couple the dock to an electric vehicle, and
     an interface coupled to the dock receptacle, wherein the interface is configured to carry at least electrical power between the electrical connector and the dock receptacle for output to chargers in the electric vehicles docked in the smart chain configuration to charge the rechargeable batteries in the electric vehicles;
   a remote server; and
   a communication unit configured to communicate wirelessly with the remote server, a database, and respective chargers in the electric vehicles over a network, wherein the remote server is configured to manage electric vehicle sessions initiated by authorized users and to manage the electric vehicles in the smart chain configuration,
   wherein the database is configured to store information on the dock, the authorized users, and the electric vehicles,
   wherein the remote server starts an electric vehicle session and sends an unlock message to a penultimate electric vehicle charger in response to an authorized user selecting the dock through an application on a mobile device, wherein the penultimate electric vehicle charger unlocks a penultimate electric vehicle lock connecting a last electric vehicle in the smart charging configuration to a penultimate electric vehicle in the smart chain configuration to release the last electric vehicle such that the last electric vehicle is an authorized user's electric vehicle.

4. The electric vehicle docking system of claim 3, further comprising:
   a power supply configured to provide electrical power over the interface through the dock receptacle; and
   a power monitor coupled to monitor power output representative of a load of the chargers of the electric vehicles coupled in the smart chain configuration through the dock receptacle.

5. The electric vehicle docking system of claim 4, wherein the interface further is configured to transfer data through the dock receptacle.

6. A system for smart chain charging of rechargeable batteries in electric vehicles, comprising:
   a dock configured to receive electrical power and couple to an electric vehicle;
   a first electric vehicle having a first charger, the first charger comprising a first plug and a first receptacle, wherein the first plug is configured to engage a dock receptacle and the first receptacle is configured for coupling to a second charger of a second electric vehicle to form a smart chain;
   a plurality of additional electric vehicles configured to be coupled sequentially as part of the smart chain, wherein each of the plurality of additional electric vehicles comprises a respective charger configured for coupling to a neighboring electric vehicle relatively closer to the dock and further configured for coupling to another neighboring electric vehicle relatively further from the dock along the smart chain;
   a remote server configured to communicate wirelessly with the dock and the first, the second, and the respective chargers over a network; and
   a database coupled to the remote server, wherein the remote server is configured to manage electric vehicle sessions requested by authorized users and to manage each electric vehicle in the smart chain and the database is configured to store information on the dock the authorized users, and each electric vehicle,
   wherein the remote server starts an electric vehicle session and sends an unlock message to a penultimate charger of a penultimate electric vehicle of the smart chain in response to an authorized user selecting the dock through an application on a mobile device, and the penultimate charger unlocks a lock at a receptacle locking a last electric vehicle to the penultimate electric vehicle such that the last electric vehicle is an authorized user's electric vehicle.

7. The system of claim 6, wherein the first electric vehicle and the plurality of additional electric vehicles comprise electric bikes.

8. The system of claim 6, wherein the first electric vehicle and the plurality of additional electric vehicles comprise electric skateboards.

9. The system of claim 6, wherein the dock includes an interface between the first electric vehicle coupled to the receptacle of the dock, wherein the interface is configured to carry the electrical power and transfer data between the dock and the first electric vehicle.

10. The system of claim 6, wherein the dock further comprises:
an interface coupled to the receptacle of the dock, wherein the interface is configured to carry power and transfer data between the dock and the receptacle of the dock; and
a power supply configured to provide the electrical power over the interface through the receptacle; and an electrical power monitor coupled to monitor electrical power output representative of a load of the chargers of the first electric vehicle and the plurality of additional electric vehicles coupled in the smart chain to the dock through the receptacle of the dock.

11. The system of claim 10, further comprising a controller that processes battery electrical power monitor data received over the interface from the chargers coupled in the smart chain to the dock through the receptacle of the dock and outputs battery charging control information through the interface.

12. The system of claim 11, wherein the battery electrical power monitor data includes information on a battery condition of respective rechargeable batteries configured to be charged by respective chargers along the smart chain of the electric vehicles.

13. The system of claim 12, wherein the battery charging control information includes information on priority of charging of rechargeable batteries along the smart chain such that rechargeable batteries located in the electric vehicles near an end of the smart chain are charged first relative to other batteries in accordance with a last in/first out docking of electrical vehicles in the smart chain by the authorized users.

14. The system of claim 11, wherein the controller further determines when a monitored electrical power value is indicative of a fault condition and controls the power supply to cease outputting electrical power.

15. The system of claim 6, wherein the dock includes an interface coupled to the receptacle of the dock and the interface is configured to carry electrical power and transfer data to electric vehicles over the smart chain between the dock and the receptacle at the dock; and wherein each respective charger of the smart chain comprises:
an interface configured to carry the electrical power and transfer data into and out of the charger along the smart chain;
a battery charger coupled to one or more rechargeable batteries; and
a battery monitor coupled to the battery charger, wherein each battery monitor is coupled to the interface for outputting respective battery monitor data and receiving respective battery charging control information.

16. The system of claim 6, further comprising the application implemented on the mobile device, wherein the application is configured to enable the authorized user to communicate with the remote server.

17. The system of claim 6, wherein the dock is a first dock and the system further comprises a second dock, each dock having one or more smart chains.

* * * * *